March 31, 1970 A. R. DAVIS ETAL 3,503,653

VELOCITY SENSING ANTISKID BRAKING SYSTEM

Filed March 13, 1967 3 Sheets-Sheet 1

INVENTORS
ALAN R. DAVIS
I. MACIT GUROL
ROBERT S. MUELLER

ATTORNEYS

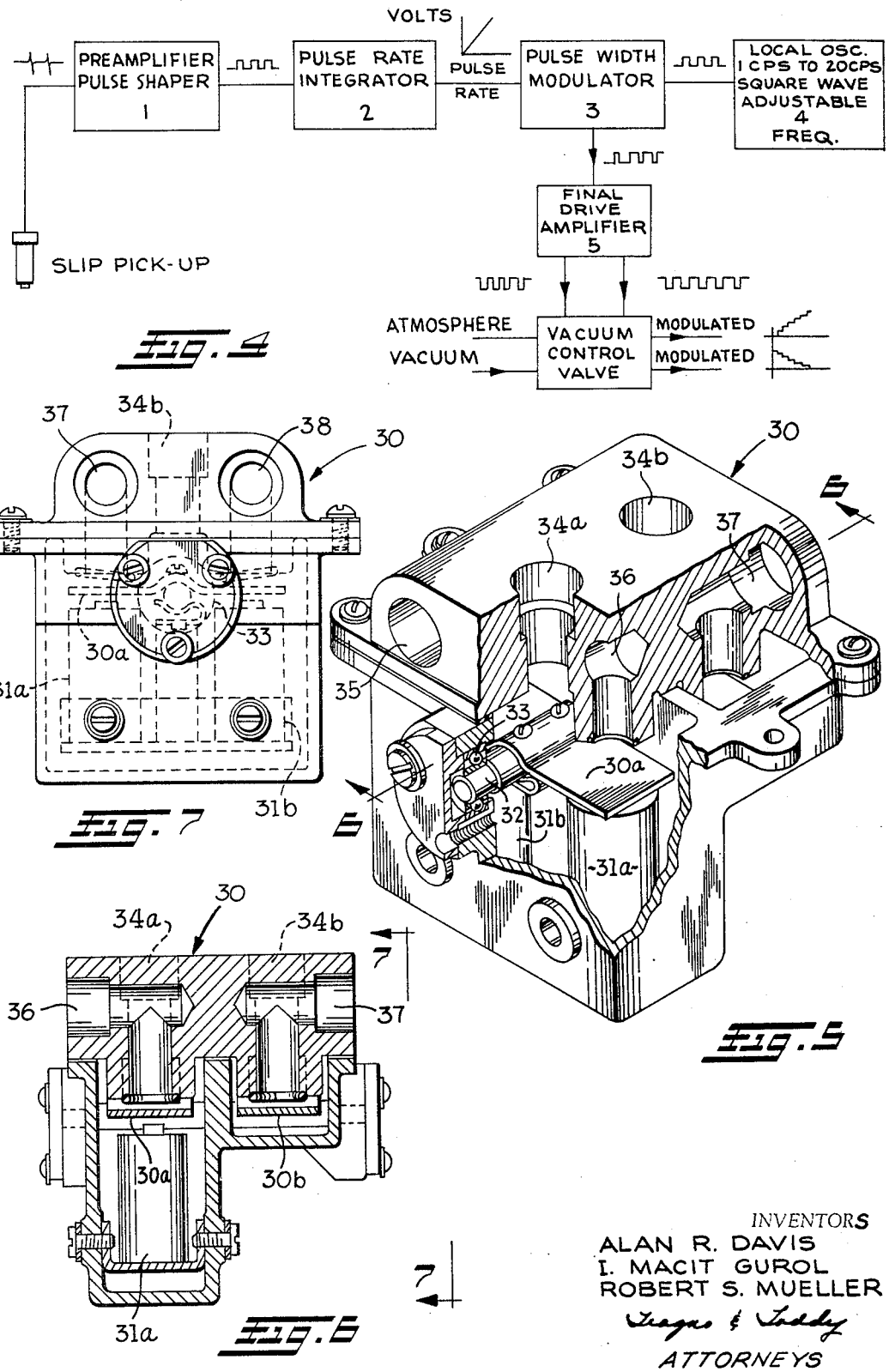

United States Patent Office 3,503,653
Patented Mar. 31, 1970

3,503,653
VELOCITY SENSING ANTI-SKID BRAKING SYSTEM
Alan R. Davis, Pontiac, I. Macit Gurol, Farmington, and Robert S. Mueller, Southfield, Mich., assignors to Eaton Yale & Towne Inc., Cleveland, Ohio, a corporation of Ohio
Filed Mar. 13, 1967, Ser. No. 622,566
Int. Cl. B60t 8/06
U.S. Cl. 303—21                                   4 Claims

ABSTRACT OF THE DISCLOSURE

A velocity sensing brake control system which senses variations in braked wheel velocity and applies a continuous skid correction by controlling the effective braking pressure through an electrically generated signal and a vacuum booster arrangement.

---

This invention relates to control systems for brake mechanisms and more particularly to an antiskid device and system for controlling the application of braking pressure to prevent a locked wheel or other undesired skid condition. It is well known that vehicles may be stopped most effectively when the wheels continue to turn even after the full application of brake pressure because the coefficient of friction of a locked wheel with respect to the surface upon which it skids is considerably less than the coefficient of friction of a rolling wheel on the same surface. Also, the fact that directional or steering control of the vehicle is lost for the most part when the vehicle goes into a skid makes it important to control vehicle braking systems to prevent undesired skid conditions.

The antiskid sensor art is a well developed one as exemplified by the great number of patents outstanding and continually obtained. However, the majority of the prior art concepts in the antiskid field are directed to the use of an inertia member which is sensitive to unusual deceleration of a vehicle wheel and the deceleration must exceed a predetermined amount before the antiskid release of brake pressure will be effected. Such deceleration responsive inertia devices affect the braking pressure upon abnormal wheel deceleration in an on-off control resulting in surging stops. Needless to say, it would be better for the vehicle driver as a safety feature, and for desirable continual control, if the braking condition could be continually sensed so that the release of braking pressure could be effected just before the point of the vehicle going into a skid condition. A continuous skid correction could be obtained even though the accelerations are zero or positive in a velocity sensing system.

It is, accordingly, the main object of the present invention to provide a skid sensing system which will sense variations in wheel velocity of a braked wheel and will control thereby the highest possible pressure which can be applied to the brake so that highly effective braking is made possible with absence of over-braking.

Another important object of the present invention is to provide a particularly effective electrical generating means for producing a signal to a brake control system in response to existing road braking conditions.

Another main object of the present invention is to provide an antiskid sensor and system which includes means mounted for relative movement in proportion to the relative vehicle wheel angular speeds and the vehicle linear velocities, with said means generating an electrical pulse or signal to a valve control system controlling the actuation of the braking system through servo-motor means.

It is another main object of the present invention to provide an antiskid system as described in the preceding paragraph wherein the generated electric pulse is modified through a pulse generator metwork to control the frequency and amplitude of said generated pulse.

It is another main object of the present invention to provide a velocity sensing antiskid system wherein said system is effective to control the vehicle braking system upon slipping of the vehicle wheels.

It is another main object of the present invention to provide a velocity sensing antiskid vehicle braking system having means producing an electrical signal in response to relative lineal and rotational velocities of vehicle wheels with the generated electrical signal being modified by a pulse generating network and fed to means controlling the vehicle braking system.

Yet another important object of the present invention is to provide a vehicle antiskid system which produces a continuous skid sensing signal independent of the acceleration of the vehicle when the linear velocity of the vehicle exceeds the angular velocity of the wheels by a predetermined differential.

These and other objects of the invention may become more readily apparent from the following detailed description in which:

FIGURE 4 is a schematic diagram of the electrical system for modifying the generated electrical signal in the present invention.

FIGURE 5 is a sectional view through a valve used in the system of the present invention.

FIGURE 6 is a cross-sectional view taken in the directions of arrows 6—6 of FIGURE 5.

Figure 1:
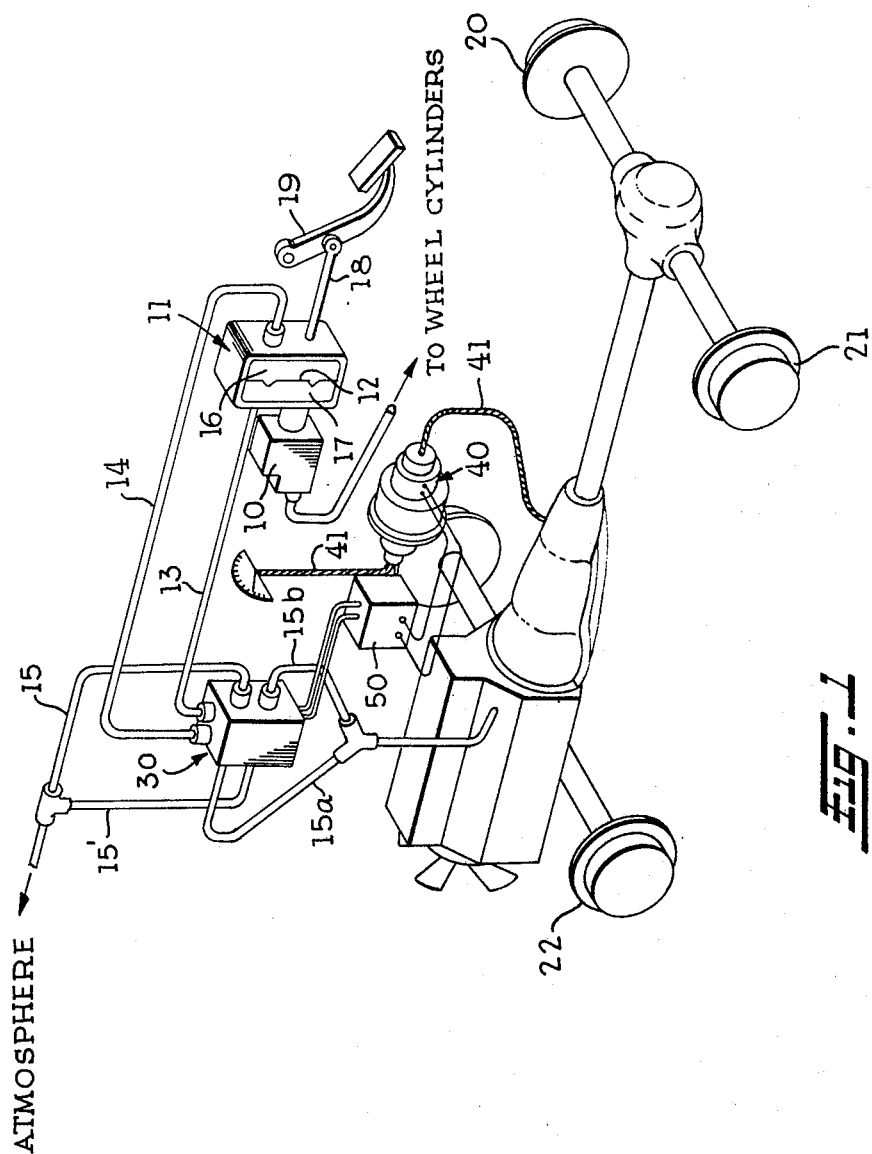
FIGURE 1 is a schematic view of a vehicle braking system embodying principles of the present invention.

The vehicle braking system shown in FIGURE 1 generally comprises a fluid pressure servo-motor driven master cylinder 10 whose hydraulic discharge is used to actuate the front wheel brakes of wheels 20 and 21 and the corresponding back wheel brakes of wheels 22. The fluid pressure actuated servo-motor 11 of the master cylinder 10 is of the type which is actuated by vacuum to atmospheric pressure differential on opposite sides of the internal diaphragm member 12. Accordingly, the servo-motor or vacuum booster 11 has conduit feed lines 13 and 14 communicating with opposite sides of the internal diaphragm 12 with either manifold vacuum or atmospheric pressure depending on the positioning of the control valve 30 to be further described hereinbelow. Vent lines 15 and 15' communicate rear chamber 16 and front chamber 17 respectively, with the atmosphere through control valve 30 while lines 15a and 15b communicate manifold vacuum to valve 30. As will be further described, the control valve 30 is automatically controlled responsive to an electric signal generated by a predetermined skid condition of the vehicle wheels. The control valve controls a differential of vacuum and atmospheric pressures in the opposite front and rear chamber 17 and 16 to produce either a rearward or forward movement of the internal diaphragm 12 and the corresponding displacement of the hydraulic fluid from the master cylinder 10 for a relieving of the braking of the vehicle wheels.

In the preferred embodiment of the invention as illustrated in FIGURE 1, only one servo-motor or vacuum booster 11 and master cylinder 10 have been illustrated, but it is to be understood that corresponding servo-motor and master cylinder devices could be utilized for controlling the braking actuation of the rear wheels separate from the front wheels. Furthermore, it is to be understood that the servo-motor or vacuum booster device illustrated could be of the type which is actuated by super atmospheric pressure or of the type in which the pressure differing from atmospheric is normally supplied to both sides of the internal diaphragm 12 and actuation is produced by bleeding atmospheric pressure to one of its chambers. As is conventional with many braking systems, the differential of the vacuum to atmospheric pressure on opposite sides of the servo-motor 11 either increases or detracts from the force of brake pedal lever 19 in displacing the hydraulic fluid from the master cylinder 10 through lever means 18 depending on the direction of the pressure differential in the servo-motor or vacuum booster 11. The hydraulic fluid from the master cylinder 10 of the FIGURE 1 system is displaced to actuate the front and rear wheel brakes of the vehicle.

Control valve 30 shown in FIGURES 5 and 6 is comprised of duplicate flapper valves 30a and 30b which are selectively controlled by solenoids 31a and 31b for pivotal movement about their shafts 32 mounted in bearings 33 of the valve housing. The flapper valves control communication between either manifold vacuum duct 35 or atmospheric duct 36 to chamber 34a in the lefthand portion of valve 30 and communication between either atmospheric duct 38 of manifold vacuum duct 37 to chamber 34b on the righthand portion of valve 30. Chamber 34a on the lefthand portion of valve 30 is communicated through line 13 (see FIGURE 1) with the front chamber of vacuum booster 11 while valve chamber 34b on the righthand side of valve 30 is communicated through line 14 (see FIGURE 1) to the rear chamber 16 of vacuum booster 11. Thus, it can be seen that upon energization of solenoid 31a flapper valves 30a are pivoted clockwise (as viewed in FIGURE 5) to permit atmospheric communication through duct 36 and chamber 34a to line 13 and the front chamber of vacuum booster 11 while the right-hand flapper valve member and 30b permits a corresponding communication of manifold vacuum through duct 37a and chamber 34b to line 14 and the rear chamber 16 of vacuum booster 11. Likewise, upon a corresponding counterclockwise pivotal movement of the flapper valves (as viewed in FIGURE 5) the opposite will occur, namely, vacuum manifold will be communicated through line 13 to front chamber 17 of vacuum booster 11 while atmospheric pressure is communicated through line 14 to the rear chamber of vacuum booster 11.

From the foregoing description it can be seen that upon energization of the solenoid 31a while the brakes of the vehicle are being actuated, the valve 30 cooperates with the vacuum booster 11 to effect a rapid reduction in the pressure being applied to the brakes. This is because the power booster 11 is of the well-known vacuum differential type and operates the brakes of the vehicle by providing a low fluid pressure or vacuum in the front chamber 17 of the vacuum booster 11 and a relatively high or atmospheric pressure in the rear chamber 16 of the vacuum booster 11. Operation of the valve 30 by energization of the solenoid 31a increases the pressure in the front chamber 17 of the vacuum booster 11 by communicating atmospheric pressure to the front chamber through the duct 36, chamber 34a and line 13. Similarly, operation of the valve 30 by energization of the solenoid 31a decreases the fluid pressure in the rear chamber 16 of the vacuum booster by providing communication between the rear chamber and a source of low pressure or vacuum through the duct 37a, chamber 34b and line 14. The positive change or increase in pressure in the front chamber 17 and the negative change or decrease in pressure in the rear chamber 16 results in the diaphragm 12 being rapidly moved or displaced toward its normal position by the change in the pressure differential across the diaphragm to thereby effect a rapid reduction in the pressure being applied to the brakes of the vehicle.

In the discussion of the present invention to follow, the terms wheel "slip" and "skid" are often used. Slip, as used is meant to denote the condition when the actual angular or rotational velocity of the vehicle wheels differs from the theoretical angular velocity for a certain lineal velocity of the vehicle. For example, if the vehicle wheels actually are rotating at 700 r.p.m., instead of their normal 750 r.p.m. while the vehicle is traveling linerally at 60 m.p.h., there would be a 50 r.p.m., "slip" of the vehicle wheels. Such a "slip" condition occurs, for example, when the vehicle is braked on an icy road and the lineal deceleration of the vehicle does not correspond to the decrease of angular wheel velocity. A "skid" condition is one of maximum wheel "slip" during which operator control of the vehicle is essentially lost. The present invention is effective to control the wheel "slip" to prevent or eliminate "skid" condition.

Figure 2:
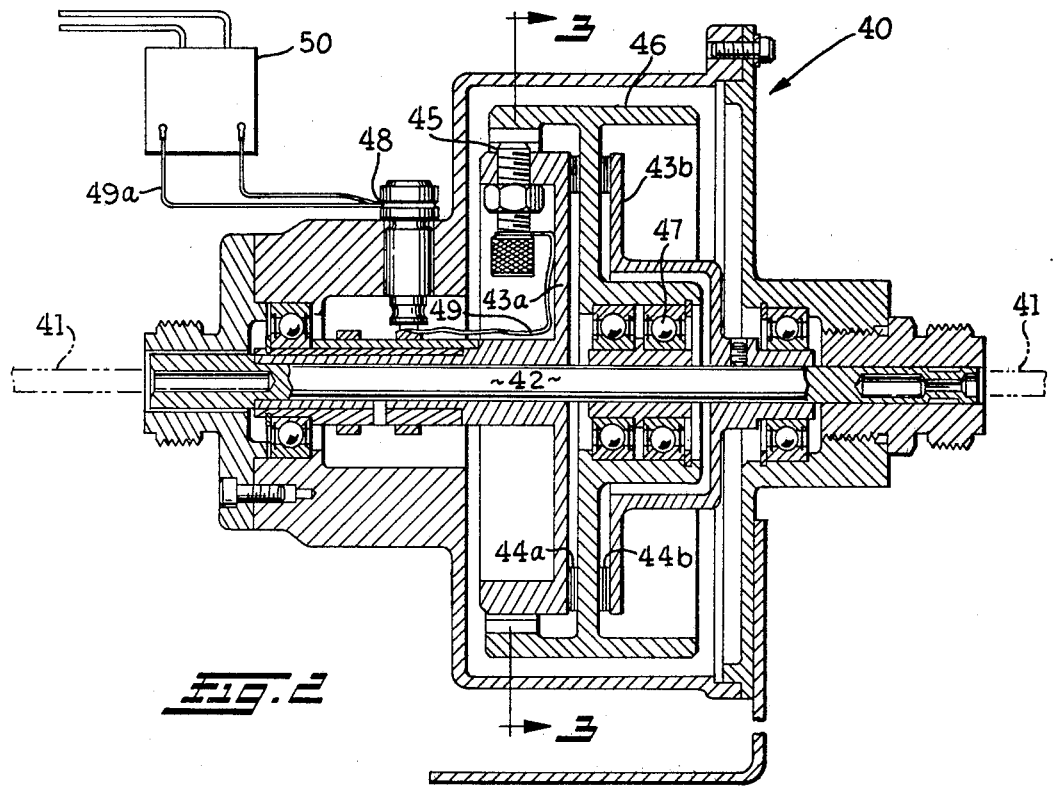
FIGURE 2 is a cross-sectional view of the skid sensor of the present invention.
Figure 3:
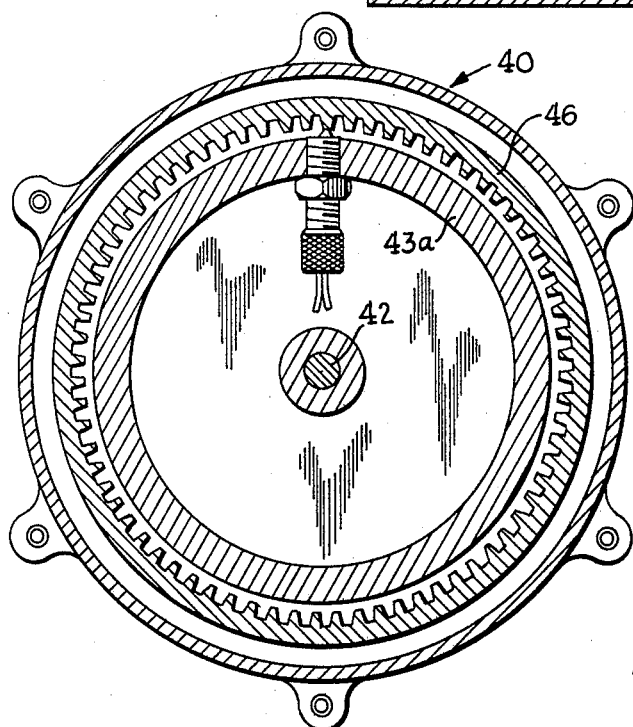
FIGURE 3 is a cross-sectional view taken in the directions of arrows 3—3 of FIGURE 2.

In accordance with the present invention, a skid sensor 40 is provided for generating an electric signal to control the operation of a control valve 30 which in turn controls the pressure differential in servo-motor 11. The skid sensing device as best seen in FIGURE 2 is driven in accordance with the speed of rotation of the vehicle wheels through the speedometer cable 41. The speedometer cable drives shaft 42 which has sleeve member 43 non-rotatably secured thereto. Sleeve members 43a and 43b carry friction material 44a and 44b and electrical winding 45 for purposes to be hereinbelow described. Fly-wheel or inertia member 46 is mounted on the shaft 42 by a combination bearing-bushing arrangement. The inertia member 46 is mounted with adequate clearance between friction material 44a and 44b so that the inertia members is not engaging both friction materials 44a and 44b simultaneously. However, inertia member 46 is so mounted that it is at all times engaging either friction materials 44a or 44b and is driven or rotated by the friction materials, which as stated above, are non-rotatably secured to shaft 42 through sleeves 43a and 43b. Upon acceleration or deceleration of the vehicle, the inertia member 46 moves axially rearward or forward respectively, (as seen in FIGURE 2) into firm engagement with friction materials 44b or 44a. Normally, inertia member 46 is driven at the rotational speed of shaft 42 through friction materials 44a and 44b. However, upon wheel slippage, shaft 42 and the associated friction materials 44a and 44b are decreasing in rotative speed with the vehicle wheels while inertia member moves forward (during deceleration) and tends to continue rotating at its rotative speed just before the wheel slippage occurred. When vehicle wheel slippage occurs, the frictional force between friction material 44a and inertia member 46 is not great enough to control the rotative inertia of member 46 which overrides or rotates with respect to the friction material 44a and the electrical winding 45. Similarly, upon slippage of the vehicle wheels during acceleration of the vehicle, inertia member 46 moves axially rearward and tends to remain rotating at the same speed as before slippage occurred, while shaft 42 and the associated friction materials 44a and 44b and the electrical winding 45 are increasing in rotative speed. Thus, upon wheel slippage during both acceleration and deceleration, relative rotation occurs between inertia member 46 and electrical winding 45. The present control sensing device is designed to be effective only upon rate of change of velocity or deceleration in controlling the vehicle brakes as control of the brakes is normally not desired upon acceleration. However, the present control sensing device is adaptable to be effective in controlling engine speed when vehicle wheel slippage occurs. Such control of the vehicle engine speed would be desired, for example, when the vehicle wheels are on icy or slippery road conditions and increase of the engine speed by the operator would result in undesired increased spinning or slippage of the wheels on the road surface. Fly-wheel member 46 is a member formed of conventional permeable steel material. The inertia member 46 has a series of equally spaced teeth on the inner periphery of the flywheel as seen in FIGURE 3. When the fly-wheel member 46 and the sleeve member 43 are rotating at the same speed, as occurs during normal conditions, the air gap between the electrical winding 45 of the sleeve member and the opposite portion of the fly-wheel member 46 remains constant. However, during relative rotation of the fly-wheel member 46 and the sleeve member 43 variations occur in the effective width of the air gap between said members because of the spaced teeth arrangement producing a periodic variation in the magnetic flux that threads the winding 45 from flux-permeable member 46. A pulsating alternating current voltage is therefore produced in winding 45 which varies in frequency and amplitude substantially in proportion to the differential of relative speeds of fly-wheel member 46 and sleeve member 43 which carries winding 45.

The electrical winding or magnetic pick-up 45 rotates at vehicle wheel velocity through the speedometer cable 41 while the sensing teeth on the inner diameter of inertia member 46 rotates in proportion to the vehicle linear velocity. Thus, the electrical output or rate of pulses generated in winding 45 because of the relative rotation of the sensing teeth of inertia member 46 and the winding 45 is of a frequency whose magnitude is proportional to the velocity difference between vehicle linear and wheel velocities.

The electrical signal generated by the skid sensing device 40 is conducted from winding 46 via leads 49 and 49a and through slip or collecting ring 48 for modification by an electronic system or pulse generator network schematically represented as 50 in FIGURE 1. The electronic system is further detailed in FIGURE 4 and is comprised of a preamplifier and pulse shaper circuit arrangement which shapes and amplifies the skid signal, a pulse rate integrator, a pulse width modulator which mixes the integrated pulse rate with a voltage pulse train supplied by a frequency oscillator 4 and a final drive amplifier which amplifies the modulated pulse and feeds it to the control valve 30. The electronic system 50 modifies the magnetic pickup pulse frequency generated by the skid sensor 40 to a voltage having a fixed frequency with varying pulse width.

In the operation of the above-described system, when a slide or skid condition producing wheel slippage occurs the angular velocity of the vehicle wheels is decreased below the corresponding lineal velocity of the vehicle and accordingly, the shaft member 43 of the control sensing device 40 is rotated at a lesser speed relative the inertia member 46 which, as discussed before, is tending to rotate relative shaft member 43 corresponding to the lineal velocity of the vehicle. Such relative movement of the inertia member to the shaft member 43 induces an electrical signal or pulse in the coil means 45 which is conducted through leads 49 to the slip-ring 48 to which are connected leads 49a leading to the modifying electronic system 50. The generated magnetic-pick-up pulsating direct current voltage varies in frequency and amplitude in proportion to the difference in relative rotational speeds of the fly-wheel member 46 and the winding-carrying sleeve member 43, which speeds are dependent on the respective lineal velocity and rotational velocity of the vehicle and vehicle wheels.

The generated magnetic pick-up pulse frequency is modified as before described in the electronic system 50 to a voltage having a fixed frequency with varying pulse width and is fed to control valve 30 for intermittently opening and closing its flapper valves 30a against ducts 35 or 36 and 37 or 38 respectively. The period of time that the solenoids 31a or 31b are energized, which determines if atmospheric or vacuum pressure is communicated to the booster 11, is dependent on the pulse width of the modified generated signal. As is obvious from the hereinabove description, the pulse width is determined by the differential of the relative speeds of the fly-wheel and sleeve members which, in turn, is determined by the sensed skid condition.

As before described, the control valve 30 controls the pressure differential on the opposite sides of the membrane 12 of the servo-motor or vacuum booster 11 for modulating the braking force as applied to the brake pedal 19. Thus, the control sensing device 40 generates a signal of a magnitude corresponding to the slip condition of the vehicle wheels with the generated electrical signal modified by an electronic system and conducted to the control valve 30 for opening and closing of said valves in response to the magnitude of the modified signal. The control of the vacuum booster 11 by the antiskid or brake control system would vary in proportion to the relative rotation of inertia member 46 and magnetic pick-up 45 which, of course, are in turn proportional to the vehicle lineal and wheel velocities respectievly. Such control of the vacuum booster would thus vary linearly from a negligible amount under normal driving conditions to a maximum during a severe skid condition producing a predetermined slip or relative rotation of the inertia member 46 and magnetic pick-up 45. This control of the brake system in direct proportion to the road conditions is preferable over the prior art schemes of on-off control which permit only one degree of control of the vacuum booster when effective. When the wheel slippage subsides, the friction material (44a and 44b) is effective to regain control of the inertia member and drive it at the same rotational speed of input shaft 42 thereby ending the generation of an electrical signal and control of the braking system.

The system of the present invention as hereinabove described is continuously sensing and comparing the relative angular velocity and linear velocities of the vehicle wheels and when wheel slip occurs, the system continuously generates a skid signal and applies a skid correction to the braking system through the control servo-motor or vacuum booster of the brakes. This arrangement of providing a continuous skid correction is highly desirable because there may be other driving conditions than a severe skid condition in which the linear speed is desired to be controlled. This feature becomes important when compared with prior art arrangements wherein deceleration of the vehicle was the condition which brought about a modulation of the brakes. However, there are other conditions than a severe skid condition in which it is desirable for a correction to be made to the braking system which will be realized in the present invention. As discussed before and is obvious from the above, the present system provides modulation or control of the vehicle brakes.

While we have illustrated and described one preferred embodiment of our invention, it should be understood that the invention is not limited to these details of construction and that numerous changes and modifications can be made without departing from the scope of the invention.

Having described our invention, we now claim:

1. A velocity sensing vehicle brake control system including a pair of relatively movable elements driven proportional to the linear velocity of the vehicle and the angular velocity of the vehicle wheels respectively, fluid pressure operated servo-motor means for operating the vehicle wheel brakes, said pair of relatively movable elements adapted to generate an electrical signal upon predetermined relative movement to each other, and means responsive to said generated signal for controlling said servo-motor means, one of said relatively movable elements comprising a flux-permeable member and having a series of equally spaced teeth on its inner periphery, the other of said relatively movable elements having an electrical winding mounted thereon so that relative motion between said elements produces variations of the air gap between said elements and resulting variation of the magnetic flux threading said winding, generating a pulsating voltage signal in said winding, the voltage signal generated being variable in magnitude and frequency in proportion to the speed of relative motion of said pair of relatively movable elements, a pulse generator network for modifying the generated voltage to a fixed frequency with varying pulse width for controlling said servo-motor control means, the modification of said generated voltage by said pulse generator network including shaping and amplifying said generated voltage pulse by a preamplifier and pulse shaper, a pulse rate integrator for integrating the pulse, a fixed-frequency oscillator for supplying a voltage pulse train for mixing with the modified pulse to modulate the pulse, and a final drive amplifier for amplifying the modified pulse before transmission to the servo-motor valve control means.

2. The velocity sensing antiskid vehicle brake control system as set forth in claim 1 wherein:

the valve control means is maintained in one position in proportion to the duration of electrical pulse generated by said relative motion of said relatively movable elements.

3. A control mechanism for comparing the linear velocity of a vehicle with the angular velocity of at least one wheel of the vehicle which during braking decelerates and accelerates, said control mechanism being adapted to be mounted on the vehicle and comprising a first rotatable member, means for effecting rotation of said first rotatable member at an angular velocity proportional to the angular velocity of the one wheel of the vehicle, a rotatable flywheel member, disconnectable drive means for effecting rotation of said rotatable flywheel member, means supporting said flywheel member for axial movement when the flywheel angular velocity exceeds the angular velocity of said rotatable member, means for reducing the angular velocity of said flywheel upon axial movement thereof in proportion to the linear velocity of the vehicle, one of said rotatable member and flywheel member being flux permeable and having a series of equally spaced teeth on a periphery thereof, and the other of the members having an electrical winding thereon so that relative motion between the members produces variations of the air gap between the members and resulting variation of the magnetic flux threading said winding thereby generating a pulsating control voltage in the winding.

4. The control mechanism according to claim 3 wherein the control voltage generated is variable in magnitude and frequency in proportion to the speed of relative motion of the members.

References Cited

UNITED STATES PATENTS

| 2,747,697 | 5/1956 | Banker | 188—181 X |
| 2,753,475 | 7/1956 | Curl | 188—181 X |
| 3,017,145 | 1/1962 | Yarber | 188—181 X |
| 3,022,114 | 2/1962 | Sampietro | 303—21 |
| 3,026,148 | 3/1962 | Ruof | 303—21 |
| 3,232,676 | 2/1966 | Cripe | 303—21 |
| 3,260,555 | 7/1966 | Packer | 303—21 |
| 3,338,637 | 8/1967 | Harned et al. | 303—21 |
| 3,365,244 | 1/1968 | Mueller | 303—21 |
| 3,401,986 | 9/1968 | Walker et al. | 303—21 |
| 3,403,945 | 10/1968 | Dewar et al. | 303—21 |

MILTON BUCHLER, Primary Examiner

DUANE A. REGER, Assistant Examiner

U.S. Cl. X.R.

188—181